March 19, 1963
G. DEARSLEY
3,081,778
METHOD OF MAKING A CIGARETTE HAVING A
COMPOSITE FILTER PLUG
Original Filed May 18, 1955
9 Sheets-Sheet 2
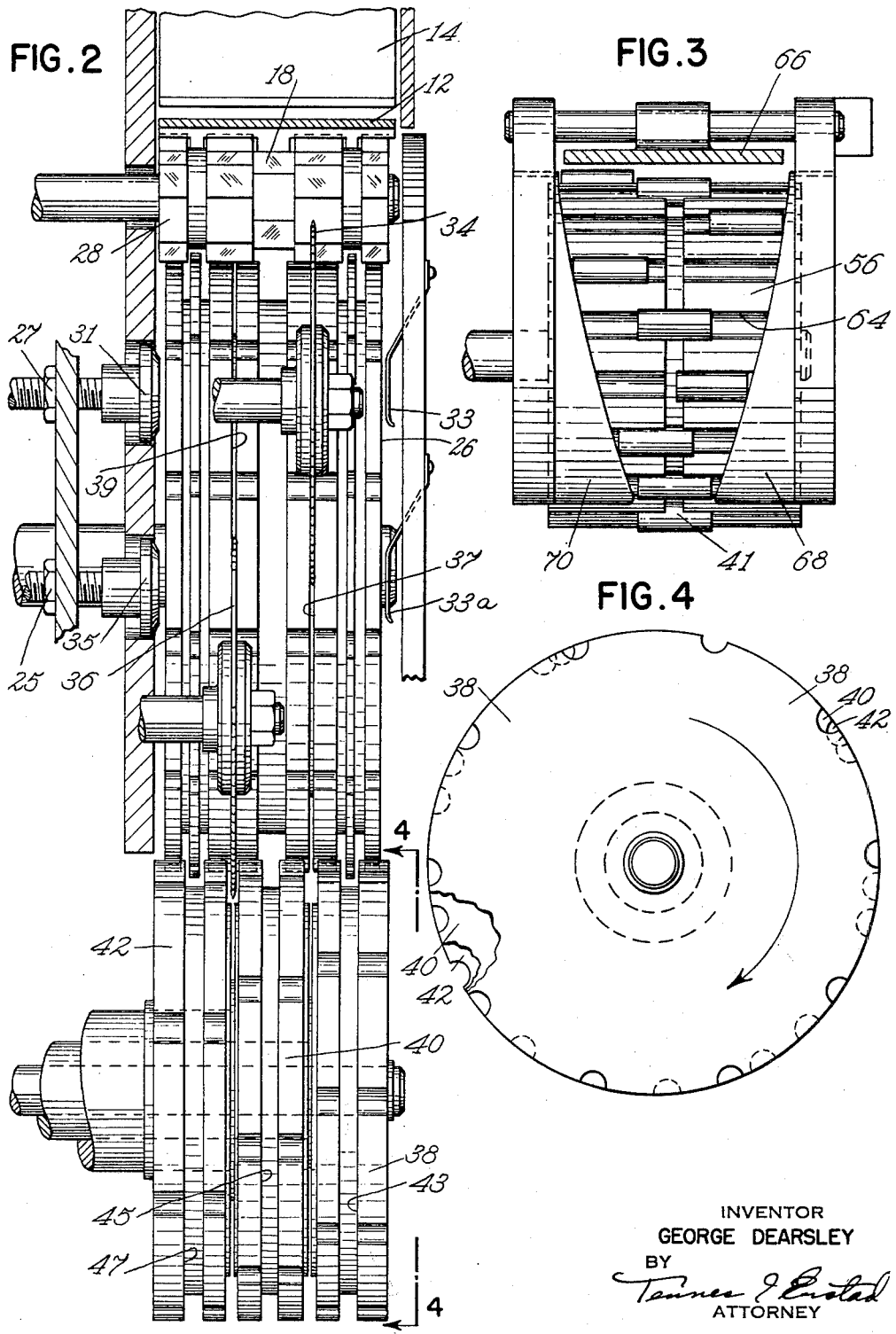
INVENTOR
GEORGE DEARSLEY
BY
ATTORNEY March 19, 1963  G. DEARSLEY  3,081,778
METHOD OF MAKING A CIGARETTE HAVING A
COMPOSITE FILTER PLUG
Original Filed May 18, 1955  9 Sheets-Sheet 3

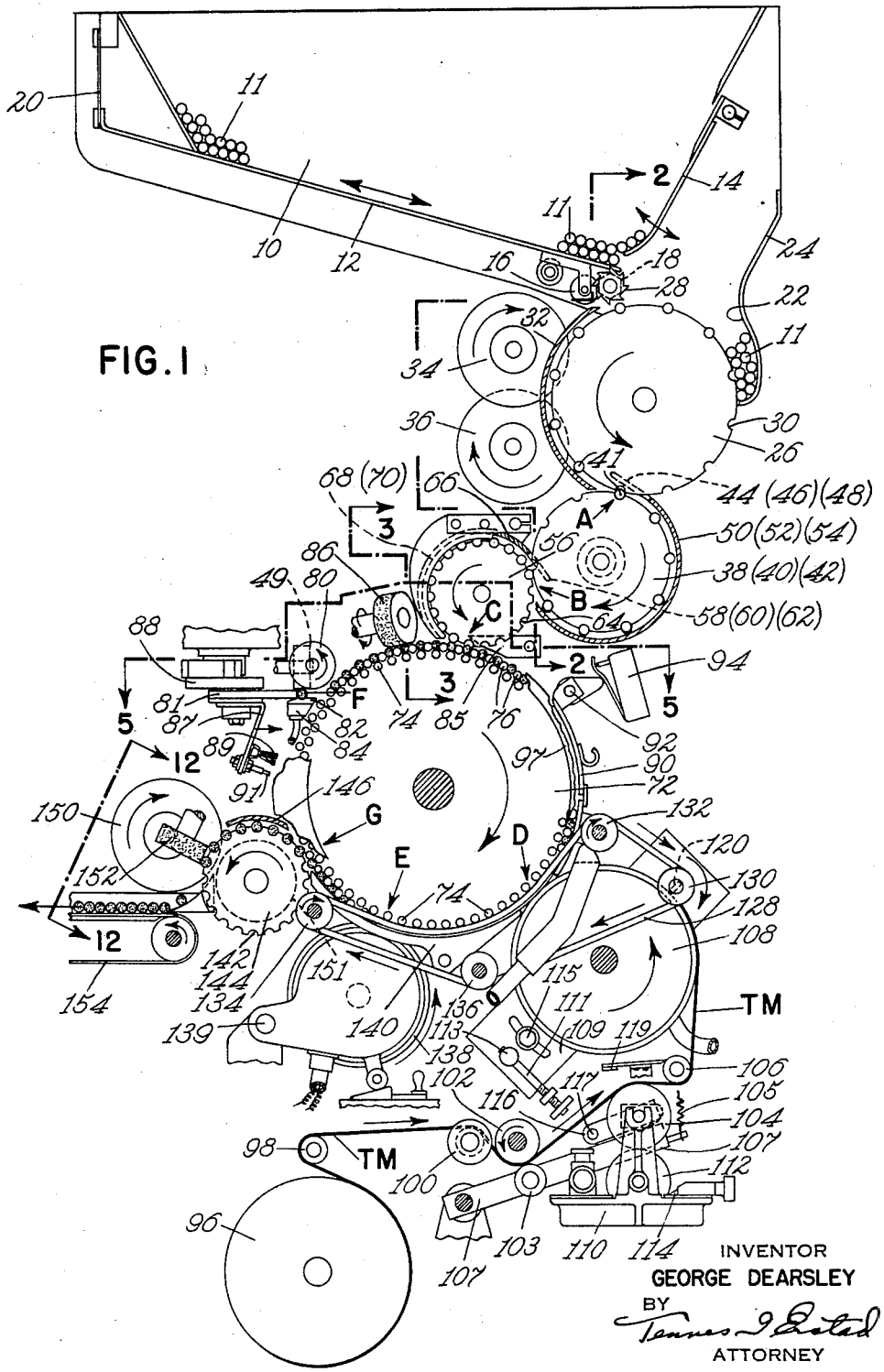

INVENTOR
GEORGE DEARSLEY
BY
ATTORNEY

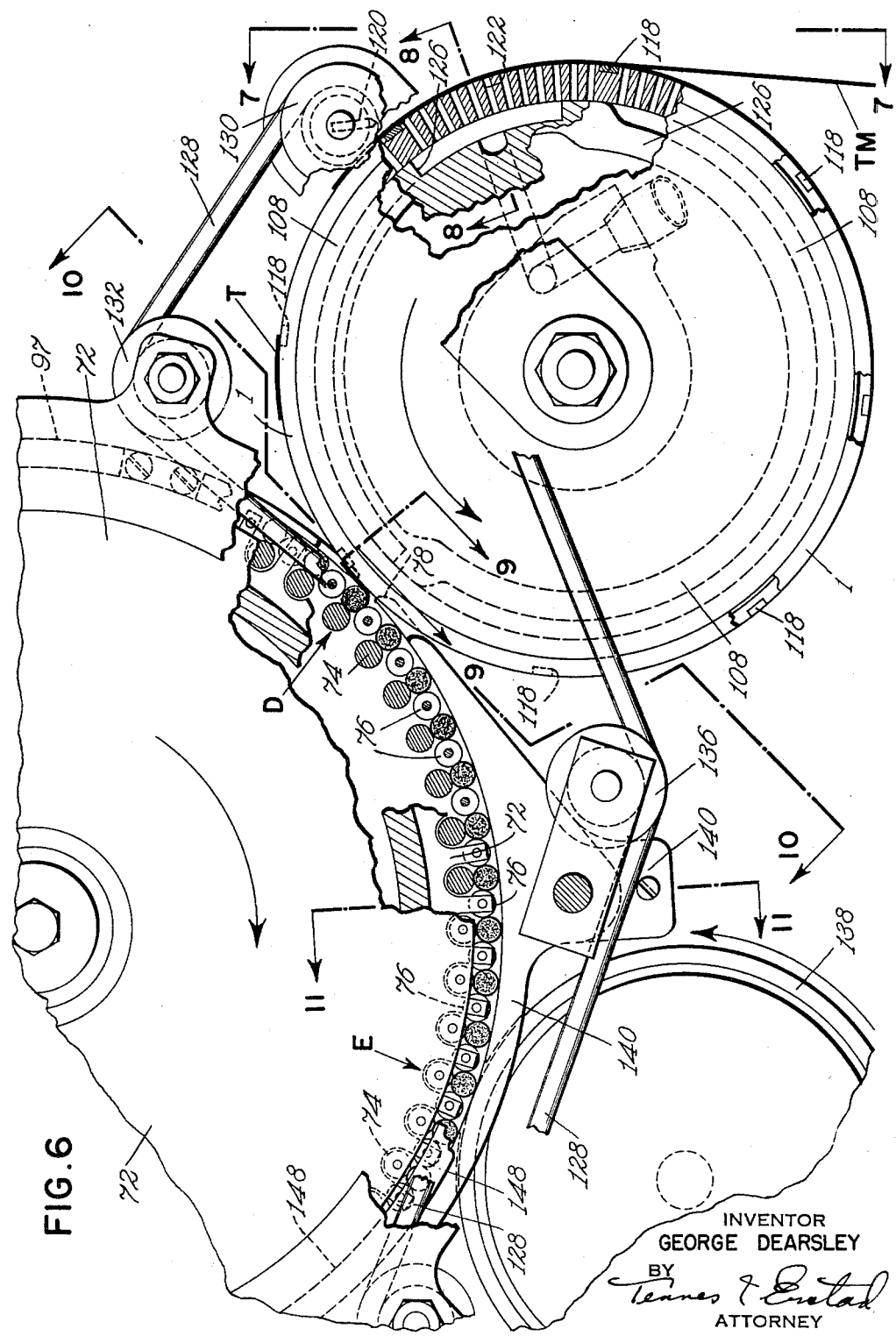

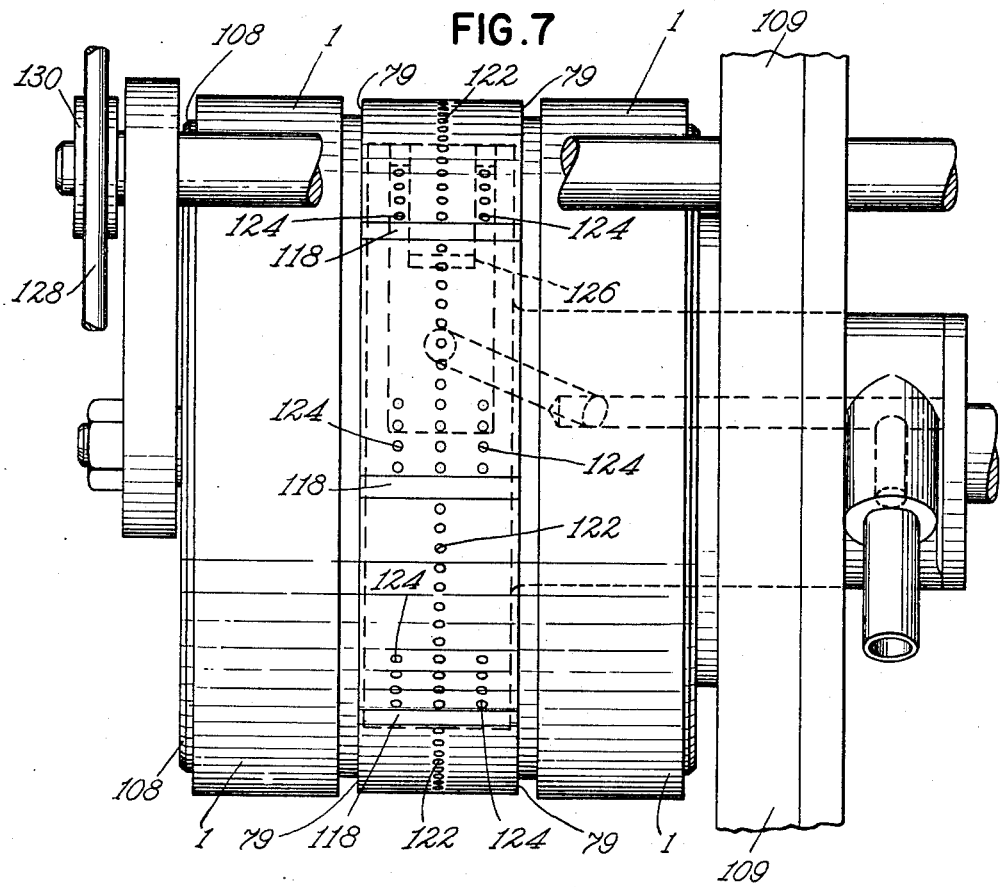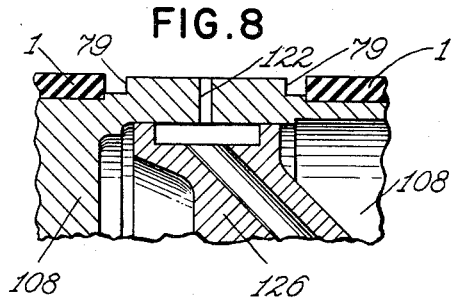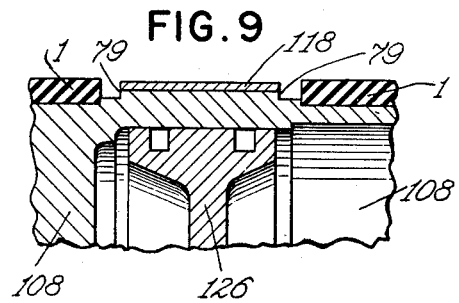

March 19, 1963 G. DEARSLEY 3,081,778
METHOD OF MAKING A CIGARETTE HAVING A
COMPOSITE FILTER PLUG
Original Filed May 18, 1955 9 Sheets-Sheet 6

INVENTOR
GEORGE DEARSLEY
BY
ATTORNEY

INVENTOR
GEORGE DEARSLEY
BY
ATTORNEY

March 19, 1963 G. DEARSLEY 3,081,778
METHOD OF MAKING A CIGARETTE HAVING A
COMPOSITE FILTER PLUG
Original Filed May 18, 1955 9 Sheets-Sheet 9

INVENTOR
GEORGE DEARSLEY
BY
ATTORNEY

United States Patent Office 3,081,778
Patented Mar. 19, 1963

3,081,778
METHOD OF MAKING A CIGARETTE HAVING A COMPOSITE FILTER PLUG
George Dearsley, Kensington, London, England, assignor to American Machine & Foundry Company, a corporation of New Jersey
Application July 23, 1959, Ser. No. 829,007, which is a division of application Ser. No. 509,293, May 18, 1955. Divided and this application Jan. 16, 1961, Ser. No. 82,843
11 Claims. (Cl. 131—94)

This invention relates to a method of making composite mouthpieces for cigarettes. This application is a divisional application of the application of George Dearsley Serial No. 829,007 for Method and Apparatus for Making Cigarettes, filed July 23, 1959, which is a divisional application of the parent application of George Dearsley Serial No. 509,293 for Method and Apparatus for Making Cigarettes, filed May 18, 1955, now Patent No. 3,036,581.

Many objections have been raised with respect to the various methods and machines heretofore employed for manufacturing mouthpiece cigarettes such as filter tip cigarettes. For example: Unsatisfactory abutment between the filter and the filler resulted in "loose necks"; filters varied in length from cigarette to cigarette; cork tips were unevenly applied to the filter and cigarette filler and the filter tip machines were cumbersome in design so that they took up a great deal of valuable floor space. These were just a few of many problems existing in this art before the present invention was developed.

With the advent of the increased demand for filter tip cigarettes, the objections to the present filter tip making machinery then in use became even more pronounced.

Filter plug attaching machines heretofore designed have been complete units in and of themselves into which cut lengths of cigarette rod and plus were fed to be "assembled" with each other to make filter tip cigarettes. These assembly type machines not only were relatively slow in operation so that the production of several cigarette making machines had to go to an even larger number of filter tip attaching machines, but also took up a great deal of valuable floor space.

The filter tip machine that "inserted" filter plugs directly into the line of cigarette tobacco were adaptable for use only with cigarette making machines of a particular design so that a cigarette manufacturer would have to buy a complete cigarette making machine and filter tip attachment to make filter tips in this manner. This was objectionable because mouthpiece cigarettes made by such special machines often did not have the uniformity in the filling thereof as cigarettes made on other conventional cigarette making machines.

It was obvious that the various "assembly" machines used up a considerable amount of floor space and, in addition, also had the various objections mentioned above. Filter tip machines of the type referred to were also slow in operation and hence more costly to operate than conventional cigarette making machines.

Heretofore the technique employed for making hollow mouthpiece cigarettes consisted in inserting first a plunger into the end of the cigarette and then inserting a hollow mouthpiece plug. This procedure not only required complex machines which could easily fail to function properly, but also it was a relatively slow method of making such cigarettes.

It is therefore an object of the invention to provide a method of making composite mouthpieces for cigarettes.

Another object of this invention is to provide a method of making mouthpiece cigarettes at a higher rate of speed than was hitherto possible.

Another object of this invention is to provide a method whereby hollow mouthpiece cigarettes may be made by the assembly of hollow mouthpieces to tobacco cigarettes.

Another object is to provide a method whereby multiple filter cigarettes may be made by the assembly of multiple composite mouthpieces to tobacco cigarettes.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

FIG. 1 is a side elevation, partly in section, illustrating the component parts of the cigarette filter tip mechanism.

FIG. 2 is an end elevation, taken on line 2—2 of FIG. 1, illustrating a portion of the hopper, the plug receiving drum in conjunction with the cutting mechanism and the plug separating drums.

FIG. 3 is an end elevation, taken on line 3—3 of FIG. 1, showing the plug aligning drum.

FIG. 4 is an end elevation of the plug separating drums taken on line 4—4 of FIG. 2.

FIG. 6 is an enlarged side elevation, partly in section, of the cigarette filter plug assembly station illustrating a portion of the cigarette carrier drum in conjunction with the tip material carrying suction drum and cutting mechanism.

FIG. 7 is an end elevation of the tip material carrying suction drum, taken on line 7—7 of FIG. 6.

FIG. 8 is a partial sectional end elevation of a peripheral portion of the suction drum, taken on line 8—8 of FIG. 6.

FIG. 9 is a partial sectional end elevation of another peripheral portion of the suction drum, taken on line 9—9 of FIG. 6.

My filter tip attaching machine is adapted to be secured to the end of a cigarette making machine where the finished cigarettes F are discharged from the cut-off and spacing belt, such as that shown in U.S. Patent 2,247,413 issued to R. E. Rundell on July 1, 1941. Since the present filter tip attachment is capable of operating at the rate of 1,000 cigarettes per minute, or a still higher, or lower speed if that should be desired, which are the approximate speeds of conventional cigarette machines in use today, there is no need for a manufacturer to buy new cigarette making machines to make filter tip cigarettes.

Figure 17:
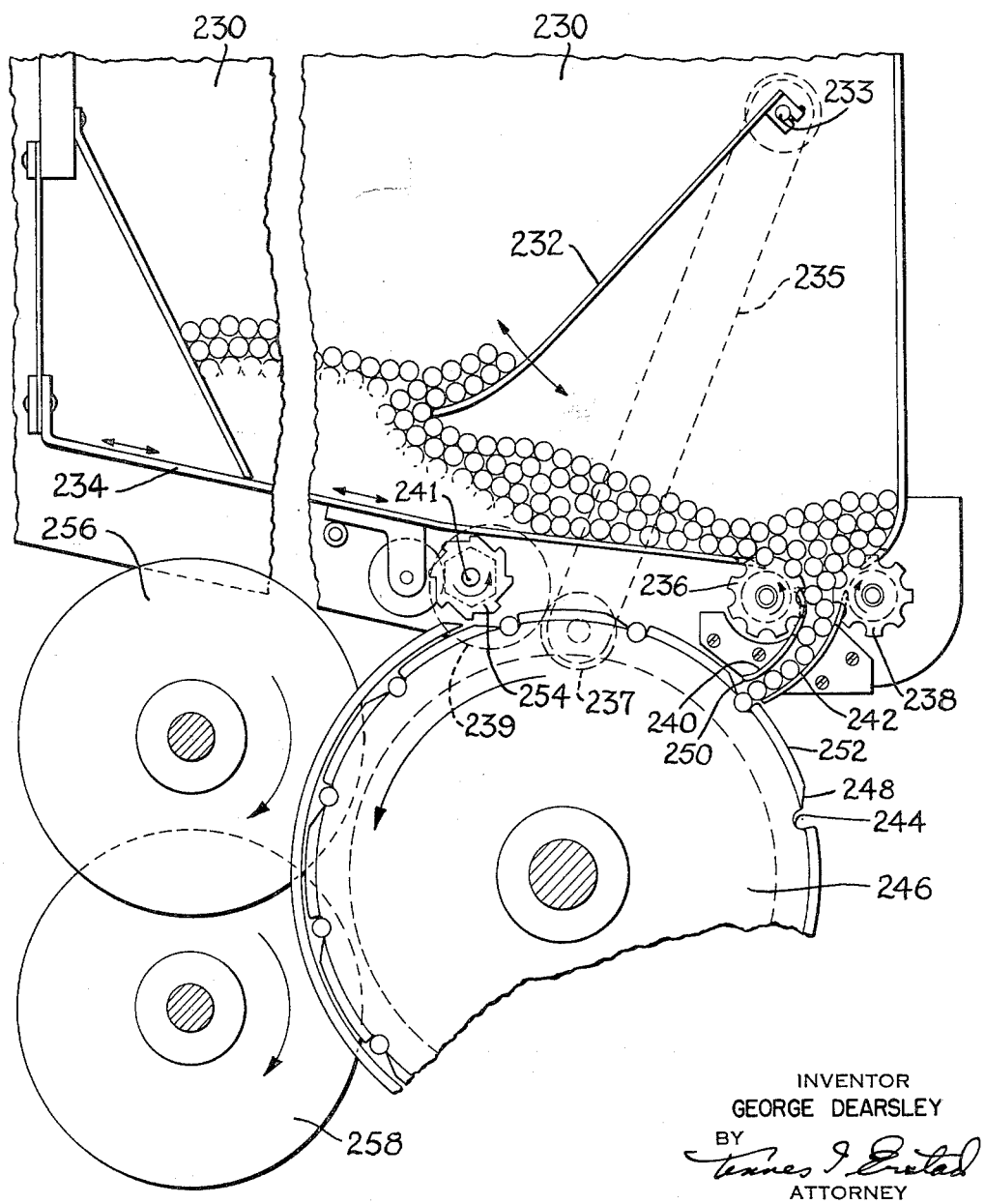
FIG. 17 shows another embodiment of an apparatus for separating and subdividing multiple lengths of rod-shaped articles into equal subdivisions.

My cigarette mouthpiece attaching apparatus consists of a mouthpiece hopper 10 into which a supply of sextuple lengths of mouthpieces are placed. Mouthpiece material is commonly purchased in sextuple lengths to facilitate handling. The embodiment of the mouthpiece cutting and aligning apparatus shown in FIG. 1 consists of the inclined floor plate 12 of the hopper and the slanted side gate 14 which are agitated or oscillated by means of a suitable vibrator. In this embodiment this is accomplished by the cam roller 16 engaging with the hexagonal rotating cam 18. FIG. 17 described hereinafter shows another means for oscillating the slanted side gate 14. The agitator floor plate 12 has a spring mounting 20 at one end which permits the plate to be readily agitated when the filter tip attachment is operated.

The sextuple lengths of cigarette plugs 11 roll downwardly out through the space between the lower end of oscillating gate 14 and agitator floor plate 12 into the reservoir 22 made up of a side wall 24, a plug receiving and conveying drum 26 and the refuser wheel 28 (FIG. 1). The plug receiving and conveying drum 26 rotates in the direction indicated by the arrow and has plug receiving grooves 30 cut transversely across the periphery of the drum 26. As the drum 26 rotates and the grooves 30 pass under the reservoir 22 holding the sextuple lengths of filter plugs 11, an individual sextuple length of cigarette filter will fall under the action of gravity into each of the grooves or pockets 30.

In the event that two or more sextuple lengths of filter plug material partially fall into the same groove the rotating refuser wheel 28 pushes back the excess, so that only one sextuple length of filter plug is allowed to remain in each pocket 30 when it passes under the stationary, spaced retaining wall 32.

The refuser wheel 28 is so constructed that the teeth on the refuser wheel 28 rotate in timed relationship with the flutes or pockets 30, in such relative angular position that a moving face is always present to remove any filter plug which may otherwise jam against the filter already nested in grooves 30 of drum 26.

Suitable flexible side guides 33 and 33A are provided for urging each sextuple length of filter plug material up against the adjustable stop plates 31 and 35 (FIG. 2). The stationary guide members 31 and 35 may be moved in or out by means of a suitable screw adjustment 25 and 27 which can be set during the operation of the machine. By adjusting members 31 and 35, the lengths of the double length of filter plug material that is severed can be readily controlled.

As the drum 26 rotates in the direction indicated by the arrow, a first rotating disc knife 34, extending through a suitable slot (not shown) formed in the retaining walls 32 and into an annular groove 37 formed in the drum 26, severs a double length from the sextuple length of filter plug material as it passes between the flexible side guide 33 and the guide head 31.

As the plug receiving and cutting drum 26 continues its rotation, it brings the filter plug material between the flexible guide 33a and a second adjustable guide member 35. The flexible guide 33a urges the filter tip material up against the guide member 35. It will be noted in this connection that the filter tip material is always being measured for cutting from the same end.

By always measuring from one end of the material in this manner, the space occupied by the knife when severing is automatically allowed for, because the quadruple length is pushed into abutment with the double length and both sections are axially aligned with each other up against the guide member 35.

Since guide member 35 may also be adjusted in and out by means of its screw mounting 25, the point at which the second knife 36 severs the quadruple length may be readily set either when the machine is stopped or when the machine is running.

By this unique cutting arrangement the length of the middle section can be readily changed to accommodate a different sextuple length than was previously used with the machine. When a pair of knives are mounted to cut through a plug simultaneously it is impossible to vary the length of the center sections without relocating the cutting knives and changing the position of the annular grooves 37 and 39.

In other words, in this invention I relocate the plug material prior to each cutting operation, rather than the cutting knives. As a consequence it is easy when sextuple length plugs run a little long or a little short to spread the variance over the three cut lengths rather than have the variances all show up in the last or the first cut length. The second cutting knife 36 similarly extends through another groove or slot (not shown) formed in the retaining walls 32 and into an annular groove 39 of the drum 26. As mentioned, this knife 36 severs the quadruple length of filter tip material into two double length filter plugs as it passes between the side guide 33a and the other guide head 35.

As the drum 26 continues its rotation, the double lengths of filter tip material are held in the grooves 30 by means of the retaining plate 32 until they are brought above the pockets of the plug separating drums 38, 40, and 42 shown in FIGS. 1 and 2 which rotate in the direction indicated by the arrow, as shown in FIG. 1.

The double length filter plugs 41 are stripped from the cutting drum 26 by means of extensions 44, 46, and 48 of the double length retaining guide walls 50, 52, and 54. As the double lengths of filter plug travel on the plug separating drum 38, 40, and 42, they are circumferentially separated from one another by each of the plug separating drums 38, 40, and 42 rotating at a slightly higher rate of speed than its adjacent drum.

As a consequence when the three double lengths of cigarette plugs have passed from station A where they are all in axial alignment to transfer station B they will have all been moved out of axial alignment with each other due to the fact that the plugs advanced and carried by drum 38 rotate at a slower speed than the plugs supported in drums 40 and 42. The drum 40, rotates at a slower speed than drum 42 and, therefore, it will have advanced its double length plug a smaller distance than the drum 42.

In this manner the three double length filter plugs have been circumferentially spaced with respect to each other so that by the time they reach station B only one double length filter plug at a time will be stripped from its respective separating drums 38, 40, and 42 into a groove of a plug aligning drum 56 (FIGS. 1 and 3) which rotates in the direction indicated by the arrow. This stripping action is effected by the strippers 58, 60 and 62 which extend into suitable grooves 43, 45, 47 formed in the plug separting drums 38, 40, and 42.

As a consequence one double length filter plug is discharged into each of the pockets 64 of the plug aligning drum 56. As the plug aligning drum 56 carries the individual double length filter plugs around with it the double length filter plugs are held in their pockets by a suitable guide wall 66. As the double length filter plugs continue their rotation with the pockets 64, the ends of the double length filter plugs 41 come into engagement with the spaced plug aligning cams 68 and 70.

As the drum 56 continues its rotation in the direction indicated by the arrow, the double elngth filter plugs, because of their engagement with the aligning cams 68 and 70, are moved axially along the length of their respective pockets 64, so that by the time they reach station C they are all in the same position aligned in a row in side-by-side spaced relationship, as shown in FIG. 3.

The plugs are then discharged by stripper 85 into suitable roller receiving pockets formed on the periphery of the assembly drum 72 in between two lengths of cut cigarette rod. Each pocket is made up of three pivoted rollers, a short roller 76 on either side and a longer inside roller 74.

The cut lengths of cigarette rod received from the cigarette making machine are spaced axially by suitable means such as speed-up roller 49 in a manner similar to that disclosed in U.S. Patent 2,124,397 granted to G. W. Gwinn et al. on July 19, 1938. A pair of suitable rubber rollers 80, shown in FIGS. 1 and 5, spaced from a stationary table bed 82 slow down the linear travel of the lengths of cigarette rod by engaging therewith. Suction is applied to the table 82 by means of a suction head 84 through which tobacco particles are withdrawn.

A kicker plate 81 is reciprocated in the direction indicated by the arrow by means of the crank 88 to push a pair of cut cigarette lengths F from between the retarding rollers 80 and the supporting table 82 into the pockets formed by the nest of rollers 74 and 76. The cigarettes so discharged, into the pockets of the cigarette assembly drum 72, are moved apart by means of a pair of rubber rollers 86 rotating in opposite directions, so that when the lengths of cigarette rod pass station C there will be sufficient space in between the cigarettes for the plug aligning drum to discharge its double length filter plug.

The cigarette assembly drum 72 rotates continuously in the direction indicated by the arrow, carrying with it the assembly of two spaced cigarette lengths and a double length filter plug located therebetween in the pockets formd by the rollers 74 and 76.

A guide bar 95 partially extends around and is spaced from the periphery of the path of rotation and employed for the purpose of properly seating the plugs between the cigarettes F in their respective pockets. A jam gate 90 is pivotally mounted on a suitable pivot 92 so that if more than one cigarette, filter stub or some other substance should manage to fall into the pockets formed by rollers 74 and 76 the excess pressure would lift up the jammed gate 90 which in turn would actuate a suitable micro switch 94 which would stop the cigarette making machine from operating.

Figure 5:
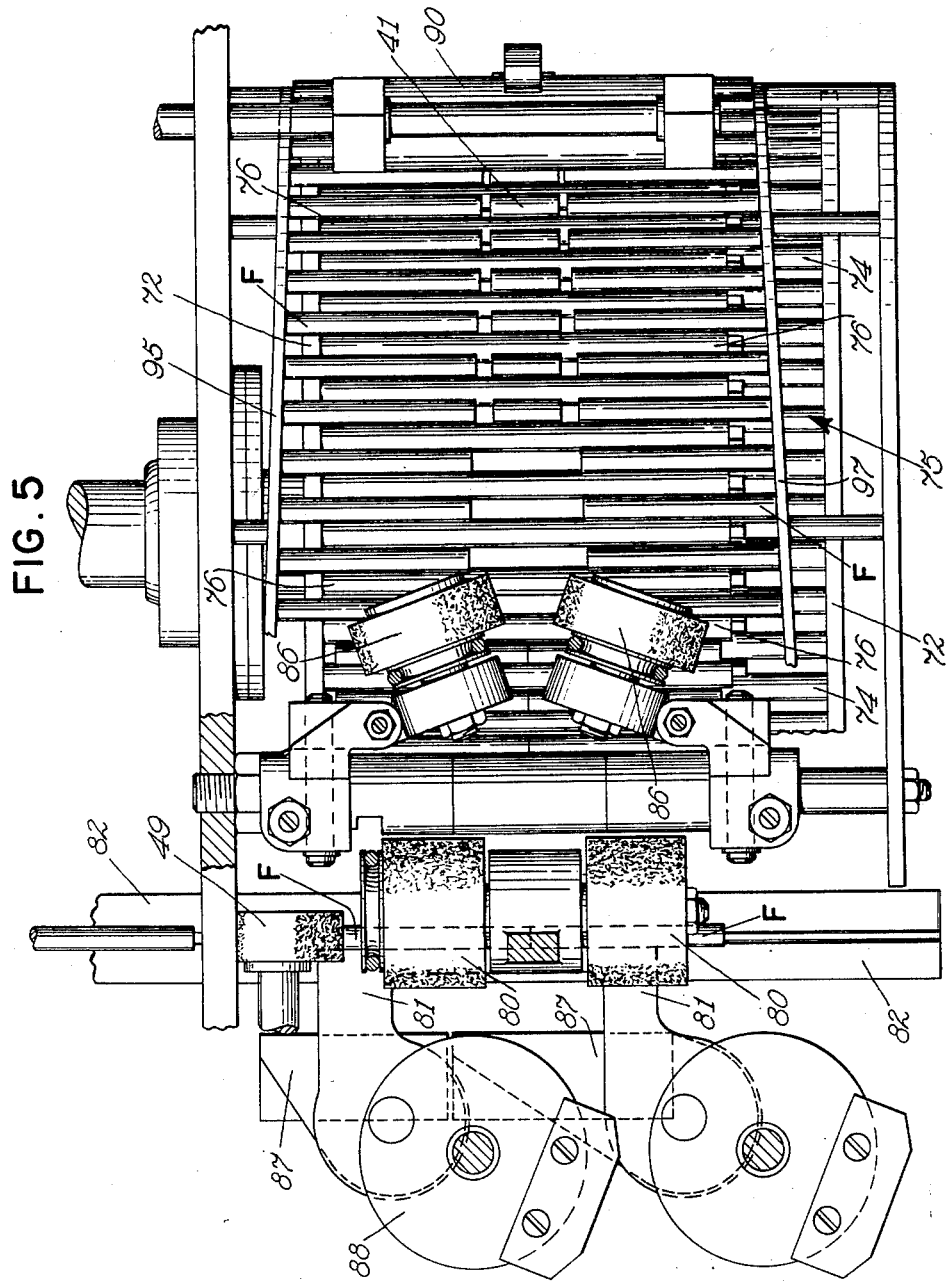
FIG. 5 is a plan view partially in section taken on line 5—5 of FIG. 1, illustrating a portion of the cigarette carrier drum in conjunction with the cigarette infeed and separating mechanism at the cigarette infeed station.
Figure 10:
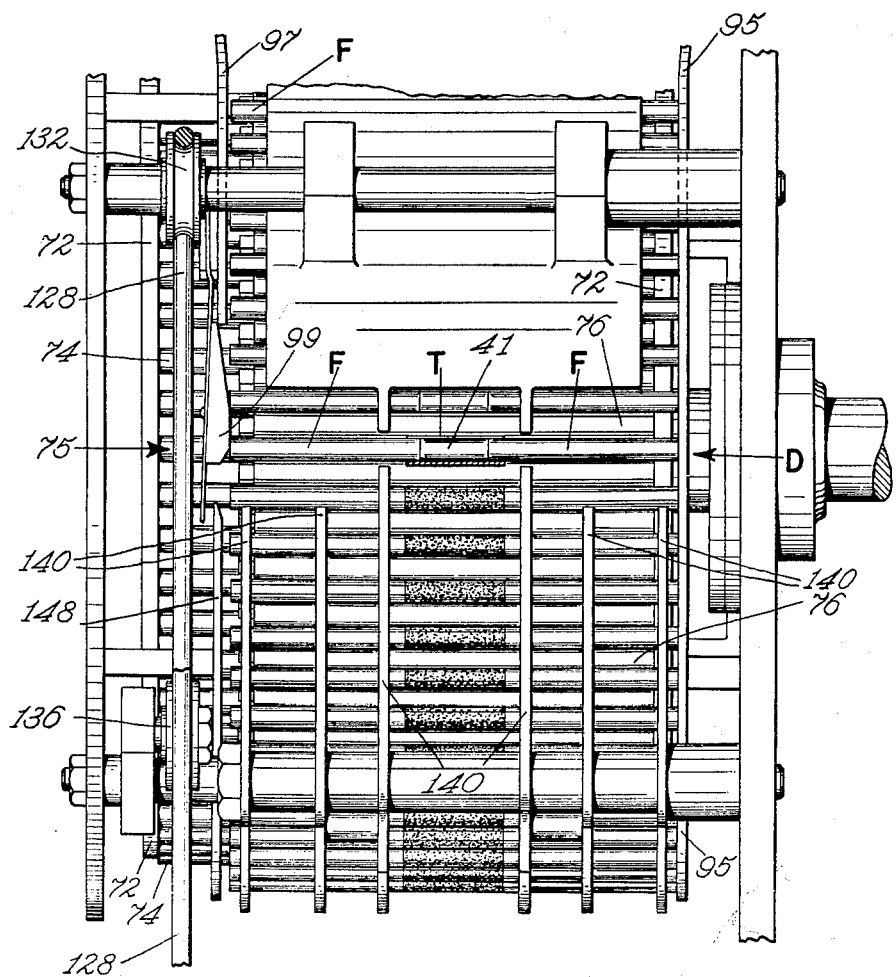
FIG. 10 is a partial end elevation of the cigarette carrier drum at the cigarette filter plug assembly station taken on line 10—10 of FIG. 6.

As the assemblies of double filter plugs and cigarette lengths continue their advance, they are gradually brought into abutment by means of a stationary guide 95 coacting with guide 97 as shown in FIGS. 5 and 10. The extreme end of the guide 97 is provided with a yieldable spring mounted guide shoe 99 which is employed for the purpose of achieving a firm abutment between the cigarette lengths and the double filter plugs.

The abutting cigarette lengths F and double length filter plug 41 are joined together by means of a uniting band T which is rolled around the assembly.

The uniting band material TM is fed from a reel 96 over pulleys 98 and 100 and between feed rollers 102 and 103 and over a paste applying roller 104 and around another guide roller 106 in the direction indicated by the arrows on to the band conveying suction drum 108. The feed rollers 102 and 103 are kept in constant engagement by a tension spring 105 connected to an arm 107 to which the feed roller 103 is pivoted. Adhesive material is stored in the glue pot 110 and is removed therefrom by a roller 112 which has excess paste trimmed therefrom by means of an adjustable scraper blade 114. The roller 112 engages with the paste applying roller 104 which transfers the glue on to the under side of the uniting band material TM.

In the event the filter tip attachment is stopped for any reason, the arm 116 carrying a band engaging extension 117 is elevated, lifting the uniting band material TM out of engagement with the glue applying roller 104 and into engagement with the stationary stop 119 so that the uniting band material will not adhere to the roller 104 and will be prevented from being pulled off the reel 96 by the movement of the suction drum 108 by reason of the fact that TM is gripped between extension 117 and stop 119.

The arm 116 simultaneously depresses the arm 107 thereby disengaging the feed roller 103 from the web TM and feed roller 102, thus effecting a stoppage of further feeding of the tip material TM.

The drum 108 has metallic insert blocks 118 mounted at spaced intervals transversely across the periphery of the drum. These inserts 118 are so spaced as to serve as meeting blocks and be opposite to the rotating cutting knife 120 each time each block 118 passes this point (see FIGURE 6).

The suction drum 108 has a unique suction hole arrangement for holding the band or tip material in contact with the surface of the suction drum 108. It will be noted that the center suction holes 122 hold the cork tip material in contact with the drum 108, but there is a slippage that takes place between the suction drum 108 and the web TM due to the fact that feed drum 102 is driven at a slower peripheral speed than the drum 108 and the web slides on the drum 108.

As the material passes beneath the knife, the leading end of the tip material is severed to form a tip T. The latter, due to the higher speed of the tip drum 108, is carried to the tip applying station D and at the same time provides spacing between the tip T and the leading end of the tip material TM.

The suction drum 108 is supported by a plate 109 which is pivotally secured on the shaft of knife 120 and is adjustable by means of an adjusting spindle 111 engaging said plate 109 by means of a swivel stud 113. After setting, a suitable lock-on screw 115 is turned to hold the plate 109 in a secured position. By means of this arrangement it is possible to move the suction drum towards and away from the assembly drum 72 thus varying the degree of pressure exerted on the filter tip assembly during the uniting band applying operation.

It will be appreciated that while I have shown the suction drum supporting plate 109 as being pivotally mounted about the shaft of the cutting knife 120, both the cutting knife 120 and the suction drum 108 could be mounted about a third pivot and obtain the same result. The important factor to be borne in mind is that the relationship of the cutting knife 120 with respect to the suction drum 108 should be not changed so as to interfere with the proper operation of the uniting band conveying drum and cutting knife.

It will be noted that the holes 124 are positioned adjacent the sides of the suction drum so as to provide a firm grip across the width of the web TM at the time it is being severed. A suction cut-off cam 126 is provided for cutting off suction from the center holes 122 as they pass the suction cut-off cam 126 thereby avoiding any unnecessary loss of suction.

It will thus be noted that the center holes 122 extend continuously around the center portion of the periphery of the drum 108 while the groups of side holes 124 are spaced circumferentially around the drum in accordance with the spacing required by the severed pieces of uniting band material.

After the center holes have passed the cutting station the suction leading to this portion of the path of travel of the center holes is cut off while suction still is allowed to act upon the side rows of holes 124 which are covered by the severed tip T. It will be noted that the center holes are not all covered by the tip T because of the slippage and spacing of the cut tip T that is effected.

As the cigarette assembly drum 72 continues its rotation the inside rollers 74 have their projecting driving end 75 engage with the belt 128 which is driven from the drive pulley 130. The belt 128 passes over idler pulleys 132, 134, and 136. The section of belt between pulleys 132 and 134 are held in contact with the driven end 75 of the inside rollers 74 to impart rotary movement thereto. This has been found to be very desirable when operating at cigarette machine speed because by the time the cigarette assembly is about to have a uniting band applied thereto, it will already have begun to rotate and there will not be any sudden accelerations of the cigarette assembly at the moment the uniting band is brought into contact with the assembly. It also has the further advantage that the inside roller 74 does not have to be driven by the rubber rings 1 through the cigarette assembly which would subject the assembly to undesirable stresses and disrupt the arrangement of the tobacco filler therein.

The side rollers 76 are shorter than the inside roller 74 and also shorter than the assembled cigarette length to permit the side guides 95 and 97 to cam the components of each assembly together as shown in FIG. 5. By the time the assembled cigarettes reach station D they are held in tight abutting relationship by side guides 95 and guide shoe 99.

The severed length of cork tip material carried by the suction drum rotating in the direction indicated by the arrow is brought into contact with the assembly of tightly held cigarettes. The rubber belts 1 and the surface of the drum 108 engage the cigarette assembly and in cooperation with driven inside roller 74 positively rotate the cigarette assembly, causing the tip T to be rolled about the assembly, between the rollers 74 and 76, and the suction drum 108.

The stripping fingers 78 ride in the recesses 79 and beside the rubber belts 1 to lift the banded cigarette assembly away from the drum 108 and confine it in the cradle of rollers 74 and 76.

When the assembly of cigarettes having the cork tip T applied thereon reaches the sealing station E they come in contact with a heater drum 138 rotating in the direction indicated by the arrow, which causes the assembly of cigarettes to be rolled within the nest of rollers and the sealing drum 138 to set and dry the adhesive carried on the cork tip material. During this portion of travel the cigarettes are held in their pockets formed by rollers 74 and 76 by means of a suitable guide plate 140 and the inner rollers 74 are positively rotated by means of belt 128 to impart to the cigarette assemblies a rotation similar to that imparted before and during the application of the uniting band.

The heating drum 138 may be mounted in a manner similar to that which supports the suction drum 108, so that it can be moved towards and away from the assembly drum 72 so as to readily regulate the pressure exerted on the cigarette, when the machine is running, so as to obtain the type of seal desired.

Figure 12:
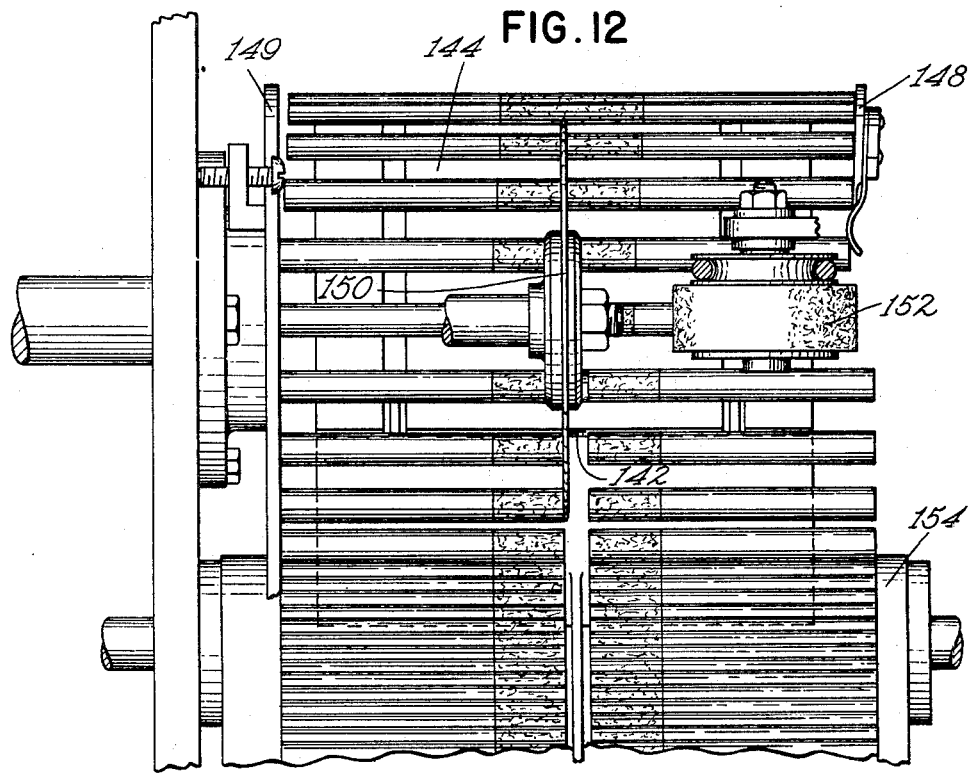
FIG. 12 is an end elevation of the cigarette cutting drum in conjunction with its separating means at the cigarette delivery station, taken on line 12—12 of FIG. 1.
Figure 11:
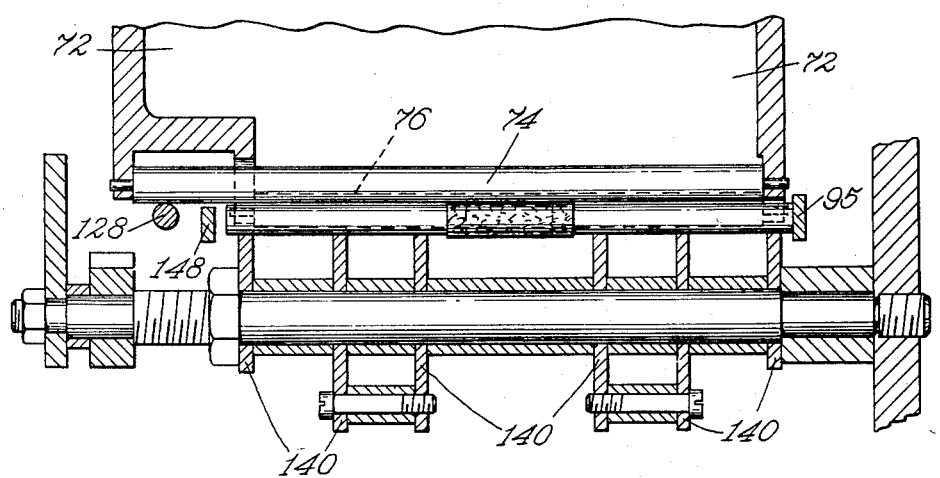
FIG. 11 is a partial sectional end elevation of a peripheral portion of the carrier drum in conjunction with the cigarette guiding means, taken on line 11—11 of FIG. 6.

When the assembled cigarettes reach the station G they drop into the pockets 142 of the cutting drum 144 which rotates in the direction indicated by the arrow. A confining plate 146 surrounds the upper portion of the periphery of the cutting drum 144 and holds the assembled cigarettes in their respective pockets 142. A side guide or plough 148 (FIG. 12) is employed to push the cigarettes up against a stationary stop 149 so as to bring the center of the double filter tip into the path of the rotating knife 150.

The knife 150 extends into an annular groove 151 formed in the cutting drum 144 so as to sever each assembly of cigarettes at their center into two filter tip cigarettes. When the cigarettes have been so severed a separating roller 152 engages with one of said severed cigarettes and pushes it axially away from the cutting knife along the groove 142, so as to provide a space between the severed cigarettes before they are discharged onto the catcher belts 154.

Every time the kicker plate 81 is moved forward it carries with it the arm bracket 87 which has on its ends a brush 89 and a finger 91. As the kicker plate completes its circulatory path of travel the brush and the finger will pass through a pair of adjoining spaced nests of rollers 74 and 76 on drum 72, clearing out any cigarettes or plug or tobacco material that might have remained in these nested roller holders.

Some manufacturers prefer to make filter tip cigarettes which have hollow mouthpieces formed at the ends thereof. Heretofore, such cigarettes were manufactured in machines known as stuffing machines. The usual stuffing system employs one machine to manufacture hollow, paper tubes complete with the desired type of mouthpiece. These complete tubes are then subsequently stuffed with filler tobacco in another machine. Machines of this type were obviously slow in operation and presented various problems with respect to attaining a uniform filling of the tobacco and also in attaining a desirable abutment between the filter plug material and the filler tobacco.

Figure 13:
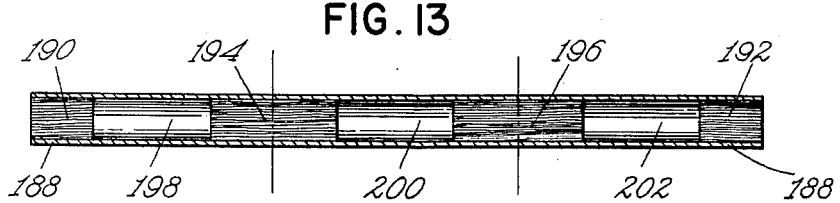
FIG. 13 is a sectional side elevation of a sextuple length hollow mouthpiece filter plug.

In the present invention, I have disclosed a method and an apparatus for carrying the method into effect for making hollow mouthpiece cigarettes as shown in FIGS. 13–16. In FIG. 13 I have shown a sextuple length of hollow mouthpiece and filter tip material which is made up of a hollow cylindrical paper tube 188 wherein filtering material has been arranged at evenly spaced intervals. At the ends, the sextuple lengths of cigarette filter are severed across the filter material, so that the ends of the sextuple lengths of filter plug material have single length filter plugs 190 and 192.

The two center filter plugs 194 and 196 are of double lengths just like the spaces 198, 200, and 202. The sextuple lengths of composite hollow mouthpiece filter plug material shown in FIG. 13 are stacked in the hopper in the same manner as the filter plug material shown in hopper 10 of FIG. 1. These sextuple lengths of hollow mouthpiece filter plug material are fed from the hopper 10 into a suitable reservoir such as that shown in FIG. 1.

Figure 14:
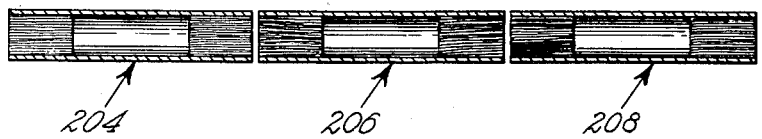
FIG. 14 is a sectional side elevation showing how a sextuple length hollow mouthpiece filter plug is severed into three double length hollow mouthpiece filter plugs.

From there the sextuple lengths of hollow mouthpiece filter plug material are received on the drum 26 which conveys them to a cutting station where they are cut transversely on the periphery of the drum into three double length hollow mouthpiece filter plugs 204, 206, and 208 as described heretofore and shown in FIGS. 1 and 14. Each double length of hollow mouthpiece filter plug material consists of single lengths of filter plug material arranged in opposite ends of the double length tube so that a double length of hollow space is located between the spaced single lengths of filter plug material.

The double length filter plugs are moved laterally relative to each other by plug separating discs 38, 40, and 42 and are arranged side-by-side in a column by means of the plug aligning drum 56 shown in FIG. 1. These double length hollow mouthpiece filter plugs are then discharged in the manner described heretofore onto the assembly drum 72. One of these composite double length filter plugs is deposited into each pocket so as to position filter plug material and hollow mouthpiece material between two cut cigarette lengths.

Figure 15:
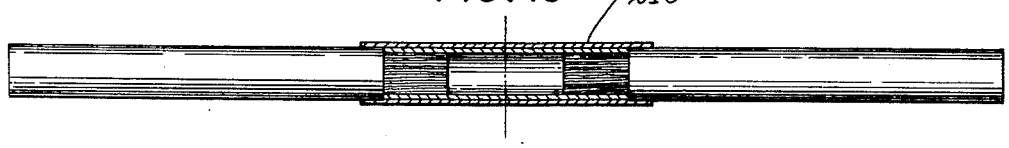
FIG. 15 is a sectional side elevation illustrating how a double length hollow mouthpiece filter plug is placed between two cigarettes and assembled by means of a cork band.

As the assembly is conveyed around by the assembly drum 72 in the manner heretofore described, a uniting band 210 is affixed to join the abutting cigarette lengths to the ends of the double length composite plug material in the manner shown in FIG. 15. Because cigarette lengths have been made by the machine in the manner to which the manufacturer is accustomed on his conventional cigarette making machine, the severed ends of the filter tip material are square and the abutting filter tip material which is similarly square will form a firm abutment between both elements so that when a uniting band is added there will be a firm abutment between the cigarette filler and the hollow mouthpiece filter plug.

Figure 16:
FIG. 16 is a sectional side elevation of a single cigarette with a hollow mouthpiece filter tip.

The united assembly is then carried to the cutting drum 144 where the double length hollow mouthpiece filter plug is severed across its center, making two hollow mouthpiece filter plug cigarettes of the type shown in FIG. 16.

For purposes of illustrating the invention, I have shown composite mouthpiece material in FIGURE 13 made up of spaced filter plugs 190, 194, 196 and 192 alternating with filter plugs 198, 200 and 202 made of some different element which could be air or might be cotton filter material, a plurality of different materials or similar substances.

Another embodiment of a plug feeding apparatus has been disclosed in FIG. 17. This embodiment is particularly desirable at high speeds if it is found that plugs tend to bridge and avoid falling into the pockets of a receiving drum. In the structure shown in FIG. 17 the sextuple filter lengths are placed in a suitable hopper 230 which is somewhat similar to the hopper 10 shown in FIG. 1 and the components that obviously correspond to each other are not specifically identified in the present embodiment since reference can be made to FIG. 1 for a more detailed description of these components.

The metering agitator flap 232 is mounted on a shaft 233 which is oscillated by means of a cam lever 235, carrying on its free end a cam roller 237. The cam roller 237 engages with a suitable cam 239 mounted on the continuously rotating shaft 241 to which is also secured the refuser 254.

The adjustable flap 232 meters the desirable amount of filters from the bulk supply hopper 230 while the vibrating bottom plate 234 controls the flow of the metered quantity of sextuple filter lengths and conveys them to the counter rotating rollers 236 and 238.

The bottom vibrating plate 234 extends up to the roller 236. Each of the rollers 236 and 238 are deeply grooved and timed, with a tooth on one opposite to the groove on the other roller, as shown in FIG. 17. These rollers 236 and 238 rotate in opposite directions at the same speed so that the tooth relationship is maintained at all times, the objective being to provide a gap through which only one filter may pass at a time, which gap rapidly oscillates in a horizontal plane in order to facilitate the passage of the filters through the gap.

The oscillating flap 232 is employed to maintain a suitable "head" of sextuple length filters over the rollers 236 and 238 at all times without permitting the weight of the bulk of the filters in hopper 230 to press on the region where the filters are separated into single file. It has been found in the arrangements just described that the sextuple length filters never tend to bridge over the rollers 236 and 238 but are sufficiently agitated to circulate freely and flow into single file without interruption.

Once the sextuple length filters pass between the rollers 236 and 238 they are held in the single file formation by the guides 240 and 242 which also act as a reservoir so that even if the flow is temporarily interrupted filters are available to fall into the flutes 244 of the drum 246 as required. The drum 246 is made in three parts as shown in FIG. 17 to allow the two circular knives 256 and 258 to sever each sextuple length filter plug material into three equal double lengths of filter material while being moved forwardly in the grooves 244. Because of this, the grooves 244 must support the filters for at least half of their circumference in order that the filter plug not be flattened by the stress imposed when undergoing cutting by the knives 256 and 258. This consequently imposes limitations on the shape of the groove and the lead into it.

It has been found that the shape of the groove as shown in FIG. 21 satisfactorily accomplishes this objective. It will be noted that the angle of the lead 248 into the groove 244 is related to the rate at which the plugs fall so that the angular lead 248 is so shaped as to obtain the maximum velocity of the filters towards the center of the drum 246 at the point where the angular lead 248 joins the half round groove 244 so that the filters move continuously with a constant acceleration toward the center of the drum 246 from the beginning of the lead 248 until they are delivered.

It will also be noted that the shape of the channel formed by the guides 240 and 242 is such that the falling plugs have a component of movement in the direction of the moving drum 246. The shape of the curvature of the lower extremity 250 of guide 240 is also of considerable importance. This must be so shaped as to efficiently retain the filters while the plain portion 252 of the drum 246 is passing under the row of filters and yet as soon as the filters start to move towards the center of the drum 246 by sliding down the angular lead 248, the curved end 250 of guide 240 must exert a component force on the filter towards the center of the drum 246 by reason of tangential force applied by the friction of the moving drum 246 and so aid accelerating the filter towards the bottom of the groove 244.

The refuser 254 prevents jamming of the mechanism by any filter that is displaced and is not properly seated in the groove 244. It is found that in this event the surplus or damaged plug is refused by the roller 254 where it can be removed manually, thereby permitting the mechanism to continue running without allowing the surplus filter to be dragged into the mechanism and to cause trouble.

To simplify the illustration of the foregoing invention I have omitted showing the various drives for the component parts since these components can be driven in synchronism with each other, and with the cigarette machine to which my attachment is secured, in any suitable manner such as by gears or by sprockets and sprocket chains.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. The method of making mouthpieces for cigarettes comprising the steps of arranging a plurality of elements of different materials in a tube, successively severing the tube through at least some of the elements, relocating said tube prior to each severing operation so that said tube is always being measured for cutting from the same end to produce a plurality of mouthpieces containing elements of at least two different materials.

2. The method of making mouthpieces for cigarettes comprising the steps of arranging more than two elements of one material in spaced relation and arranging between each pair of spaced elements of said one material at least one element of a second material in a tube, successively severing the tube through the midpoints of each of the spaced elements except the first and the last and relocating said tube prior to each severing operation so that said tube is always being measured from the same end to produce double length composite mouthpieces.

3. The method of making filters for cigarettes having composite filter plugs comprising the steps of arranging more than two filter plugs of one material in alternating relation with at least two filter plugs of a second material in a paper tube, successively severing the paper tube through the midpoints of each plug of the one material excepting the first and the last and relocating said tube prior to each severing operation so that said tube is always being measured from the same end to produce double length filters.

4. The method of making hollow mouthpieces for cigarettes comprising the steps of arranging more than two filter plugs in spaced relation in a paper tube, successively severing the paper tube through the midpoints of each filter plug except the first and the last and relocating said tube prior to each severing operation so that said tube is always being measured for cutting from the same end to produce double length hollow mouthpieces.

5. The method of making a cigarette having a filter including composite filter plugs comprising the steps of arranging a plurality of filter plugs of different materials in a paper tube, successively severing the paper tube through some of the filter plugs, relocating said tube prior to each severing operation so that said tube is always being measured for cutting from the same end so as to produce a plurality of filters having composite filter plugs, placing the filter against a cigarette rod, and applying a uniting band around the filter and the cigarette rod to produce a filter tip cigarette having a composite filter plug.

6. The method of making cigarettes having filters including composite filter plugs comprising the steps of arranging more than two filter plugs of one material in spaced relation in a paper tube and arranging between each pair of adjacent filter plugs of said one material at least one filter plug of a second material in the paper tube, successively severing the paper tube through each plug of one material except the first and the last and relocating said paper tube prior to each cutting operation to produce double length filters, placing each double length filter between a pair of cigarette rods arranged in end to end spaced relation, applying a uniting band around the double length filter and the pair of cigarette rods, and severing the double length filter and the uniting band through their midpoints to produce two filter tip cigarettes having composite filter plugs.

7. The method of making cigarettes having filters including composite filter plugs comprising the steps of arranging more than two filter plugs of one material in spaced relation and arranging between each pair of adjacent filter plugs of said one material at least one filter plug of a second material in a paper tube, successively severing the paper tube through the midpoints of each plug of one material except the first and the last and relocating said paper tube prior to each cutting operation to produce double length filters, placing each double length filter between a pair of cigarette rods arranged in end to end spaced relation, applying a uniting band around the double length filter and the pair of cigarette rods, and severing the double length filter and the uniting band through their midpoints to produce two filter tip cigarettes having composite filter plugs.

8. The method of making cigarettes having filters including composite filter plugs comprising the steps of arranging more than two filter plugs of one material in alternating relation with at least two filter plugs of a second material in a paper tube, successively severing the paper tube through the midpoints of each plug of one material except the first and last relocating said paper tube prior to each cutting operation to produce double length filters, placing each double length filter between a pair of cigarette rods arranged in end to end spaced relation, applying a uniting band around the double length filter and the pair of cigarette rods, and severing the double length filter and the uniting band through their midpoints to produce two filter tip cigarettes having composite filter plugs.

9. The method of making hollow mouthpiece cigarettes which comprises successively severing hollow mouthpiece material, relocating said material prior to each severing operation to form said material into double lengths required for making two hollow mouthpiece cigarettes, spacing cut lengths of cigarette rod axially from each other, inserting said double length of hollow mouthpiece material axially in between said axially spaced cut lengths of cigarette rod, bringing said cut lengths of cigarette rod into axial abutment with said double length hollow mouthpiece, joining said double length hollow mouthpiece to the abutting ends of said cut length of cigarette rod by means of tipping material rolled thereon and then severing said hollow mouthpiece across its center to form two hollow mouthpiece cigarettes.

10. The method of making hollow mouthpiece cigarettes having filters which comprises spacing double length plugs of filter material in a hollow tube into each end of which is placed a single length of filter material, successively severing said tube across the center of the double filter plugs and relocating said tube prior to each severing operation to form double lengths of mouthpiece and filter tip material, so that the filter material is located at the opposite ends of each double length of hollow tube with a hollow space in the tube between said single filter plugs, positioning said double lengths of hollow tube with single lengths of filter plug material in the ends thereof in between two cut lengths of cigarette rod, moving the cut lengths of cigarette rod axially to bring the ends thereof into abutment with the ends of said double length tubes, joining the double lengths of hollow tubing having filter material in the ends thereof to the cut lengths of cigarette rod so that the filter material is in abutment with the end of the cigarette rod, and then severing said hollow mouthpiece across the center thereof to form two hollow mouthpiece cigarettes having filter material adjacent the ends of the cut lengths of cigarette rod.

11. The method of making composite mouthpieces for cigarettes comprising spacing similar composite elements making up a mouthpiece from each other and interspersing them between a component element of a different nature, then feeding said spaced elements sidewise to successively subdivide said composite assembly into mouthpieces of the same complex composition and length, relocating said assembly prior to each subdivision operation then joining said subdivided composite to a cigarette length.

References Cited in the file of this patent

UNITED STATES PATENTS

| | | |
|---|---|---|
| 987,359 | Gueniffet et al. | Mar. 21, 1911 |
| 2,156,600 | Molins | May 2, 1939 |
| 2,219,491 | Podmore | Oct. 29, 1940 |
| 2,707,960 | Janecke | May 10, 1955 |
| 2,728,346 | Crawford | Dec. 27, 1955 |
| 2,795,227 | Seldeen | June 11, 1957 |
| 2,809,640 | Oldenkamp | Oct. 15, 1957 |
| 2,820,460 | Bunzl et al. | Jan. 21, 1958 |
| 2,830,595 | Korber | Apr. 15, 1958 |
| 2,874,701 | Stelzer | Feb. 24, 1959 |
| 2,920,631 | Korber | Jan. 12, 1960 |